United States Patent [19]

Moench

[11] Patent Number: 5,222,778
[45] Date of Patent: Jun. 29, 1993

[54] WORKPIECE GRIPPING APPARATUS

[75] Inventor: Uwe Moench, Bensheim, Fed. Rep. of Germany

[73] Assignee: Hofmann Maschinenbau GmbH, Pfungstadt, Fed. Rep. of Germany

[21] Appl. No.: 763,584

[22] Filed: Sep. 23, 1991

[30] Foreign Application Priority Data

Nov. 28, 1990 [DE] Fed. Rep. of Germany ....... 4037883

[51] Int. Cl.⁵ .................. B25J 15/02; B25J 19/02
[52] U.S. Cl. .................. 294/86.4; 294/907; 901/34
[58] Field of Search ............. 294/86.4, 88, 103.1, 294/106, 119.1, 119.3, 118, 902, 907; 269/257, 271, 273, 274, 285; 310/311, 314, 316, 317, 338; 318/568.16, 568.17, 568.21, 646; 901/30-34, 36-39, 46

[56] References Cited

U.S. PATENT DOCUMENTS

| | | | |
|---|---|---|---|
| 4,579,380 | 4/1986 | Zaremsky et al. | 294/907 X |
| 4,605,354 | 8/1986 | Daly | 294/907 X |
| 4,611,377 | 9/1986 | McCormick et al. | 294/119.1 X |
| 4,621,331 | 11/1986 | Iwata | 901/31 X |
| 4,667,997 | 5/1987 | Udagawa et al. | 294/907 X |
| 4,715,773 | 12/1987 | Parker et al. | 901/34 X |
| 4,792,715 | 12/1988 | Barsky | 294/907 X |

FOREIGN PATENT DOCUMENTS

| | | |
|---|---|---|
| 3332147 | 3/1985 | Fed. Rep. of Germany ...... 294/907 |
| 280499 | 7/1990 | German Democratic Rep. ... 901/34 |
| 138271 | 10/1979 | Japan ................. 294/119.1 |
| 216788 | 8/1989 | Japan ................. 294/119.1 |
| 289692 | 11/1989 | Japan ................. 294/119.1 |
| 617257 | 7/1978 | U.S.S.R. ................ 901/34 |
| 867646 | 9/1981 | U.S.S.R. ................ 901/33 |
| 1096098 | 6/1984 | U.S.S.R. ................ 294/119.1 |
| 1360981 | 12/1987 | U.S.S.R. ................ 901/34 |
| 2166710 | 5/1986 | United Kingdom .......... 901/38 |

Primary Examiner—Johnny D. Cherry
Attorney, Agent, or Firm—Cushman, Darby & Cushman

[57] ABSTRACT

Apparatus for gripping a workpiece such as a rotor is provided which includes gripper arms, a pressure-sensitive sensing member on one of the arms for continuously measuring the gripping force applied by the arms, and a piezoelectric actuator on the outer arm which is actuated to provide fine adjustment of the gripping force in dependence on the output of the sensing member.

5 Claims, 1 Drawing Sheet

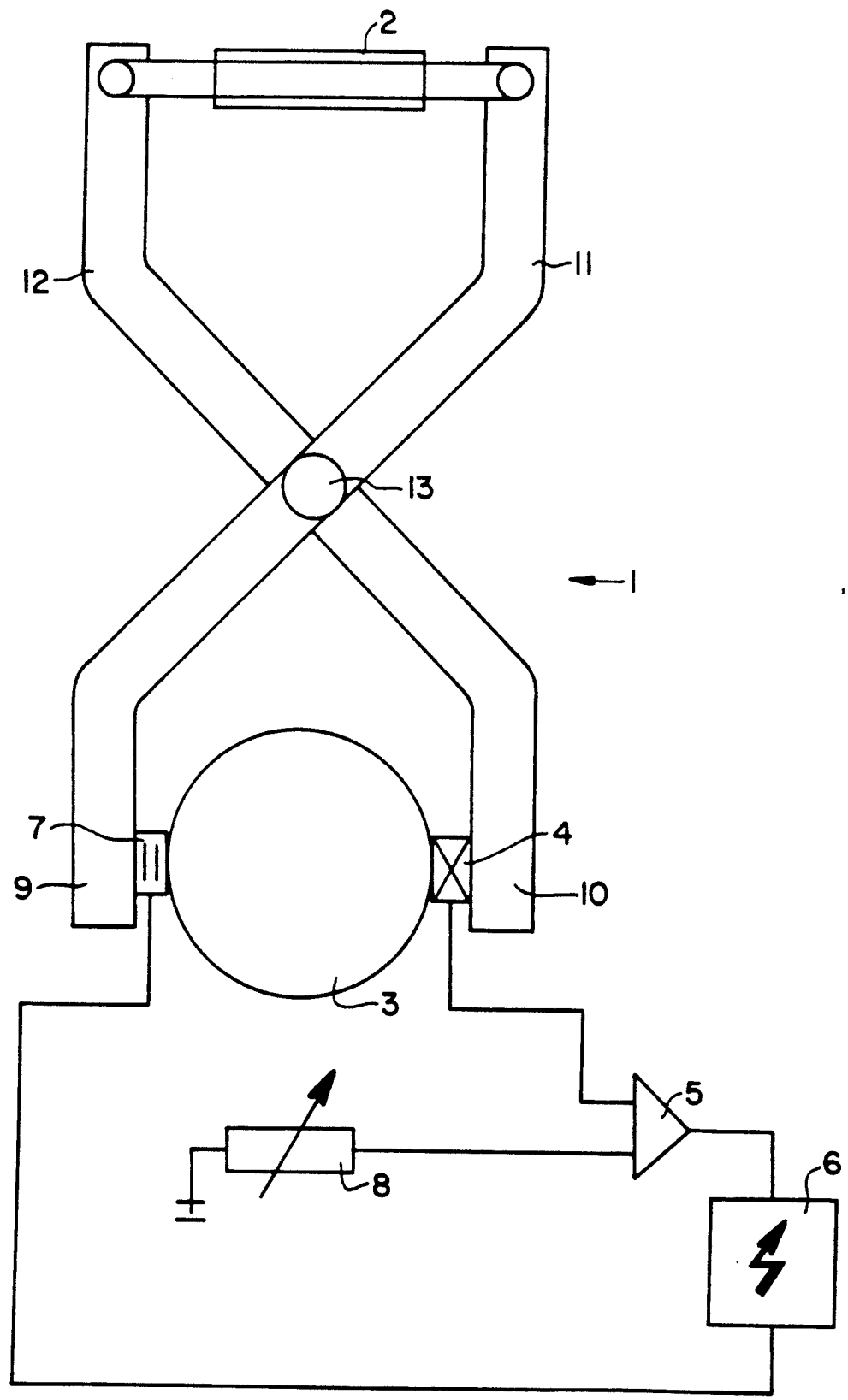

WORKPIECE GRIPPING APPARATUS

BACKGROUND OF THE INVENTION

There are numerous situations which involve a workpiece being removed for example from a workpiece processing station by means of a gripping apparatus and possibly transported into another working station, or which involve a workpiece being fixed in a proper position, for example for a working operation to be carried out thereon. For such purposes the gripping apparatus may generally comprise a gripping device which can be set by means of an adjusting mechanism to the workpiece to be handled, so that the respective workpieces can be gripped with a specific gripping force which is such as to ensure that the workpiece is adequately held by the gripping device for example during the transportation operation.

SUMMARY OF THE INVENTION

An object of the present invention is to provide an apparatus for gripping a workpiece which ensures that the workpiece is gripped in an extremely careful fashion.

A further object of the present invention is to provide an apparatus for gripping a workpiece such as a rotary member or rotor which requires sensitive handling, such as to substantially avoid damaging the workpiece in the course of gripping thereof.

Still a further object of the present invention is to provide a workpiece gripping apparatus which is of a simple design configuration while nonetheless being reliable in operation and ensuring delicate handling of sensitive workpieces.

In accordance with the principles of the present invention the foregoing and other objects are achieved by an apparatus for gripping a workpiece such as a rotor, comprising a mechanical gripping means and a displacement means for actuating the gripping means in dependence on the dimensions of the workpiece to be gripped. The apparatus further includes a pressure-sensitive sensing means for sensing the gripping force with which the gripping means engages the workpiece. The displacement means of the workpiece gripping apparatus comprises a coarse adjustment means, for approximately setting the position of the gripping means for gripping the workpiece, and a fine adjustment means in the form of a piezoelectric actuator disposed on the gripping means in a position such that it lies between a workpiece to be gripped and an adjoining portion of the gripping means. The piezoelectric actuator is adapted to be actuated with an electrical signal in dependence on the output signal from the pressure-sensitive sensing means and an adjustable reference value for the gripping force.

As will be seen in greater detail hereinafter, the piezoelectric actuator thus operates to provide for fine adjustment of the pressure force by which the workpiece to be gripped is held by the gripping means, thereby to ensure that the workpiece can be held in a sensitive and careful manner. That ensures careful handling of workpieces which are to be transported by the apparatus, which is a particularly important consideration when dealing with sensitive workpieces, for example workpieces which have a sensitive surface which can easily be damaged.

In a preferred feature the gripping means comprises first and second gripper arms which are adapted to hold the workpiece between them with a preset gripping force. The pressure-sensitive sensig means and the piezoelectric actuator are disposed in the path of the flow of force between the first and second gripper arms together with the workpiece. With that configuration of the apparatus the first and second gripper arms may engage the workpiece at diametrally opposite locations thereon, with the piezoelectric actuator and the pressure-sensitive sensing means therefore preferably being disposed in diametrally opposite relationship with respect to the workpiece. Preferably, the pressure-sensitive sensing means and the piezoelectric actuator are arranged between the workpiece and a respective one of the gripper arms.

That arrangement thus provides that the workpiece is held in a sensitive fashion, with the gripping force being regulated by operation of the actuator in dependence on the pressure-sensitive sensing means, which affords a high degree of sensitivity in operation, and the preset reference value in respect of the gripping force. The actuator thus acts as a piezoelectric control element to produce a regulated finely adjusted pressure force when holding the workpiece, in response to the sensed pressure force which is applied to the workpiece.

In a preferred feature of the invention the pressure-sensitive sensing means may be in the form of a piezoelectric element, while in a further preferred feature the pressure-sensitive sensing means and the piezoelectric actuator are connected together by way of a regulating means. The regulating means may comprise a comparison means having a first input connected to the output of the pressure-sensitive sensing means and a second input to which is connected a means for generating a reference value in respect of the gripping force. The output of the comparison means is connected to an adjustable voltage source for supplying the piezoelectric actuator with a set voltage signal for appropriate operation thereof.

Further objects, features and advantages of the present invention will be apparent from the following description of a preferred embodiment.

BRIEF DESCRIPTION OF THE DRAWING

The single FIGURE of the accompanying drawing is a diagrammatic view of an embodiment of the apparatus in accordance with the principles of the present invention.

DESCRIPTION OF THE PREFERRED EMBODIMENT

Referring now to the single FIGURE of the accompanying drawing, illustrated therein is an embodiment of an apparatus for gripping a workpiece, in accordance with the invention, comprising a mechanical gripping means 1 in the general configuration of a tongs assembly. Reference numeral 3 in the drawing shows a workpiece to be gripped thereby, illustrated in the form of a rotor.

The mechanical gripping means 1 comprises first and second gripper arms 9 and 10, and first and second free tongs legs 11 and 12. The gripper arms 9, 10 and the legs 11, 12 are pivotably connected together in crossed relationship at a pivot location 13.

The apparatus further includes a displacement means for actuating the gripping means 1, in dependence on the dimensions of a workpiece to be gripped thereby. The displacement means comprises a coarse adjustment mechanism 2 which is operatively disposed between and is pivotably connected to the free ends of the first and second legs 11 and 12 of the gripping means 1. The coarse adjustment mechanism 2 is utilized to coarsely adjust the distance between the gripper arms so as to fix a workpiece 3 to be gripped, in dependence on the respective diameter thereof. When the workpiece 3 is to be gripped by means of the gripper arms 9, 10, the gripping force with which the workpiece 3 is engaged is detected by means of a pressure-sensitive sensing device as indicated at 4. The pressure-sensitive sensing device 4 may be a piezoelectric element which produces an output signal in dependence on the detected gripping force or pressure force applied to the workpiece 3 by closure towards each other of the free ends of the gripper arms 9, 10, under the actuating force of the coarse adjustment mechanism 2.

The output signal from the sensing means 4 is passed to an input of an operational amplifier comparator 5. A reference value in respect of the gripping force to be applied to the workpiece 3 is passed to the second input of the comparator 5, from a gripping force reference value generator 8. The gripping force can be preset in the reference value generator 8, more specifically in dependence on the respective workpiece to be gripped.

The output signal from the output of the comparator 5, which is proportional to the comparison result as between the output signal of the pressure-sensitive sensing means 4 and the signal from the gripping force reference generator 8, is applied to an adjustable voltage source 6. In dependence on the signal supplied thereto from the comparator 5, the voltage source 6 generates an output voltage and passes it to a piezoelectric actuator 7. The actuator 7 is operatively disposed between the workpiece 3 and a free end portion of one of the first and second gripper arms 9 and 10, being the gripper arm 9 in the illustrated embodiment. It will be seen that the actuator 7 is thus disposed in opposite relationship to the sensing device 4 which is carried at the free end portion of the other gripper arm, being the gripper arm 10 as illustrated in the drawing. As the two gripper arms 9 and 10 diametrally oppositely engage the workpiece 3 which is illustrated as being of a round cross-section, the pressure-sensitive sensing device 4 and the piezoelectric actuator 7 are also disposed at diametrally opposite positions in relation to the workpiece 3. The illustrated apparatus makes it possible for the workpiece 3 for example to be held and transported or fixed at a specific desired location under the application thereto of the maximum gripping force at which the workpiece 3 and more especially the surface thereof does not yet suffer from damage, which is often an important consideration when dealing with sensitive workpieces which are readily susceptible to damage when gripped in that way. In operation of the apparatus therefore, the piezoelectric actuator 7 acts in the direction of the flow of force which must be applied to the workpiece 3 for the purposes of holding it in position between the gripper arms 9 and 10. The path of the flow of force is substantially between the gripper arm 9, the piezoelectric actuator 7, the workpiece 3, the pressure-sensitive sensing device 4 and the second gripper arm 10. When the apparatus is used for dealing with a round workpiece such as a rotor, the path of the flow of force applied thereto generally passes through the axis of the workpiece. In the course of the control or adjusting movement which the actuator 7 performs when it is producing the desired finely adjusted gripping force, the gripper arm 9 acts on one side of the workpiece as a support member, insofar as the actuator 7 braces itself against the gripper arm as the actuator 7 applies the gripping force to the workpiece 3.

The illustrated embodiment of the apparatus according to the invention provides that the workpiece 3 is held between the first and second gripper arms 9 and 10 by virtue of the application of force to the workpiece 3. It will be appreciated that it is also possible for the holding force applied to the workpiece 3 to be supplemented by a positive interengagement between the workpiece 3 and the portions of the apparatus engaging same, for example by the contact surfaces of the piezoelectric components 4 and 7 which directly engage the surface of the workpiece 3 being suitably adapted to the configuration of the workpiece 3 to provide a degree of interlock therewith.

It will be seen therefore that the present invention provides a workpiece gripping apparatus in which the gripping force is continuously measured, possibly utilizing a piezoelectric effect, and in which adjustment of the gripping force is continuously effected by means of the piezoelectric actuator 7 operating as a piezoelectric fine adjustment element.

The apparatus of the invention is suitable for fixing and transporting workpieces of any configuration. It can provide for careful treatment of the workpiece being handled so that the workpiece is protected from damage thereto. It is therefore possible for the apparatus reliably to handle highly sensitive workpieces. More especially, the apparatus according to the invention can be used for dealing with rotors, for example in a balancing machine, for removing them after machining thereof from a measuring station or from the balancing machine, or for transportation thereof within the balancing machine, for example from a measuring station to a balancing station, and so forth.

It will be appreciated that the above-described embodiment of the workpiece gripping apparatus according to the present invention has been set forth solely by way of example and illustration of the principles thereof and that various modifications and alterations may be made therein without thereby departing from the spirit and scope of the invention.

What is claimed is:

1. An apparatus for gripping a workpiece comprising:
   first and second gripper arms, each arm having a free end portion disposed on opposing sides of the workpiece;
   displacement means operatively coupled to said gripper arms for moving said free end portions of said gripper arms toward and away from the workpiece;
   sensing means disposed on one of said free end portions for sensing force applied to the workpiece when said displacement means moves said gripper arms into a gripping relation with the workpiece, said sensing means producing an output signal corresponding to said force;
   a piezoelectric actuator disposed on said free end portion of the gripper arm opposite the gripper arm having said sensing means,
   generating means for outputting a signal representative of an adjustable reference value in respect to said force exerted on said workpiece;
   means for comparing the output signal from said sensing means and the output signal from said generating means to obtain a comparison result, said comparing means generating an electrical signal for actuating said piezoelectric actuator based on said comparison result to vary the force applied to the workpiece.

2. The apparatus as claimed in claim 1, wherein said piezoelectric actuator and said sensing means are diametrically opposed on said free end portions of said gripper arms.

3. The apparatus as claimed in claim 1, wherein the workpiece has a circular cross-section and the piezoelectric actuator and said sensing means contact the workpiece at points which define a diameter of the workpiece.

4. The apparatus as claimed in claim 1, wherein said sensing means is a pressure-sensitive piezoelectric element.

5. The apparatus as claimed in claim 1, wherein said generating means include a reference value generator.

* * * * *